3,758,321
CONDITIONING OF PHTHALOCYANINE
COMPOUNDS
John F. Santimauro, Wyckoff, N.J., and Herman Gerson, New York, N.Y., assignors to Allied Chemical Corporation, New York, N.Y.
No Drawing. Filed Jan. 25, 1971, Ser. No. 109,662
Int. Cl. C08h 17/14
U.S. Cl. 106—288 Q    11 Claims

ABSTRACT OF THE DISCLOSURE

Phthalocyanine compounds, especially halogenated phthalocyanine compounds, are conditioned to pigment form by grinding the unconditioned compounds while suspended in an aqueous medium comprising a minor amount of a water-immiscible volatile organic liquid and a major amount of water. The resulting pigments are softer in texture and of superior light-fastness compared to conventionally obtained phthalocyanines. The process for their preparation is substantially free of corrosion and pollution problems which are characteristic of many prior art conditioning processes.

BACKGROUND OF THE INVENTION

This invention relates to a novel process for conditioning phthalocyanines, especially halogenated copper phthalocyanines, to pigments characterized by softness of texture and excellent lightfastness.

Phthalocyanine compounds, especially metal-containing phthalocyanines, are well known in the prior art as excellent light-fast pigments useful as colorants for paints, lacquers, printing inks, plastics, synthetic fibers and the like. In common with other materials to be used as pigments, these compounds as obtained from the usual synthetic procedures are not suitable for use directly as pigments, the particle size and/or crystal habit in which they are initially obtained being too large or otherwise unsuitable.

The pigment art is replete with processes for the conditioning of phthalocyanines so as to improve their pigmentary properties which are unsatisfactory in crude form. The well known acid pasting procedure whereby the unconditioned material is treated with concentrated sulfuric acid and the solution drowned in water or an aqueous solution provides a relatively simple means for the reduction of the particle size of the phthalocyanine. However, the use of concentrated mineral acid represents a hazard to personnel, equipment, and entails the use of large volumes of reagents and costly equipment. Moreover, pollution problems are created in disposing of large volumes of the acid wastes from such processes.

Another technique involves the grinding of crude phthalocyanines in the presence of certain volatile organic solvents. This general procedure is subject to the disadvantages that the use of rather substantial quantities of relatively expensive organic solvents involves inherent fire and explosion hazards, solvent recovery costs, solvent losses and/or water pollution problems.

Still another technique, applicable especially to highly chlorinated copper phthalocyanines, involves the heating of an organic dyestuff in an aqueous medium at or above 90° C., preferably between 100° C. and 300° C., while, advantageously, agitating the mixture. This procedure results in soft, readily dispersible products, and is effective as a means of breaking up agglomerates of crude pigments which are obtained in a finely divided form but which on drying undergo increments in grain size and harden. Such a procedure is ineffective when applied to a crude pigment, the particle size of which is relatively large.

It is obvious that such prior art processes leave much to be desired in the conditioning of phthalocyanines to the pigment state.

OBJECT OF THE INVENTION

It is, therefore, a principal object of our invention to devise an effective and economic process for converting phthalocyanine compounds to pigments characterized by excellent texture and lightfastness.

Another object is to devise a process for conditioning phthalocyanine compounds which process does not involve the use of corrosive acids or organic solvents in inherently hazardous quantities.

Other objects and advantages ancillary thereto will be obvious from the following description of our invention.

DETAILED DESCRIPTION OF THE INVENTION

We have made the surprising discovery that phthalocyanine compounds can be effectively and economically conditioned to pigment form by milling or grinding the crude phthalocyanine compound suspended in a medium which is comprised of more than about 60% by weight of water, and less than about 40% by weight of a water-immiscible volatile organic solvent. By "volatile," we mean a solvent boiling below 150° C. at normal pressure. The organic solvent component is present in the suspension medium in the amount of at less 4 parts by weight per 100 parts by weight of the crude phthalocyanine compound. Preferably, the conditioning operation is carried out in the presence of a surfactant, an inorganic oxidizing agent and/or a salt whose aqueous solution reacts alkaline, i.e. "an alkaline salt."

The resulting conditioned phthalocyanine compounds, when compared to those conditioned by known conditioning procedures, are softer in texture, show excellent color value, and when used to pigment surface coatings are superior with respect to light-fastness on prolonged exposure to Florida sun.

It was, indeed, surprising to discover the effectiveness of our process, since omission of the water-immiscible organic liquid from the mixture being ground provides substantially no conditioning of the phthalocyanine compound, other than in ineffectual reduction in the particle size of the compound.

We have found that the conditioning process of our invention proceeds in three, at least, distinct stages:

(1) a mixing and grinding stage,
(2) a flushed stage where the organic liquid adheres to the pigment particles forming large lumps in a distinct non-aqueous phase,
(3) a conditioned stage where the lumps disintegrate and the pigment is dispersed in the water phase.

The phthalocyanine compounds conditioned according to the process of our invention are characterized by a desirable soft texture and by excellent fastness to light. "Texture" of a pigment, as used herein, refers to softness of feel, freedom from grit and the ease of developing the full tinctorial strength of the colorant when incorporated into a liquid coating composition.

The process of our invention is applicable to the conditioning of phthalocyanine compounds and especially halogenated metal-containing phthalocyanines. Among this class of pigments the following may be mentioned as typical:

copper phthalocyanine
cobalt phthalocyanine
nickel phthalocyanine monochloro copper phthalocyanine
dichloro copper phthalocyanine
tetrachloro copper phthalocyanine
monochloromonobromo copper phthalocyanine
tetrabromo copper phthalocyanine
hexadecachloro copper phthalocyanine Mixtures of these phthalocyanine compounds are included also. The preparation of the crude phthalocyanine compounds is well known in this art.

The conditioning process of our invention is carried out by suspending the crude phthalocyanine in an aqeous suspension medium. The amount of such medium required to suspend the phthalocyanine compound may be varied over a broad range but generally at least about 300 parts of the suspension medium for every 100 parts of crude phthalocyanine will be required to obtain a suspension of satisfactory fluidity to be ground or milled. Preferably from about 350 to about 600 parts of the suspension medium per 100 parts of crude phthalocyanine compound is used to provide suspensions of sufficient fluidity. Larger ratios are generally not required and may result in inefficient utilization of the grinding/milling apparatus.

The suspension medium is comprised of a mixture of water and a water-immiscible volatile organic liquid, and may have associated therewith a surfactant, an inorganic oxidizing agent, and/or an alkaline salt. Such adjuvants when present will be used in relatively small amounts, and will be dissolved in the aqueous phase of the suspension medium.

The water component of the suspension medium shuold amount to at least about sixty percent by weight of the mixture, and preferably this suspension medium should contain from about 75% to 95% by weight of water.

The water-immiscible volatile organic liquid component of the suspension medium is present in an amount less than about 40% by weight of the medium. Sufficient of the medium should be used to provide at least about 4 parts of this organic liquid for each 100 parts of the crude phthalocyanine compound being conditioned. Preferably about 15 to about 30 parts of organic liquid per 100 parts of phthalocyanine compound should be used. Although mixtures of aliphatic hydrocarbons derived from petroleum boiling over the narrow range of about 60° to 85° C., are preferred, other such organic liquids boiling up to about 150° C. can be employed. Typical of such alternatives are ligroin                 octane
trichloroethylene       benzene
perchloroethylene       toluene
heptane                 xylene
hexane                  cyclohexane Mixtures of these and equivalent volatile organic liquids can be used, and are contemplated herein, also.

It is preferred to carry out the novel conditioning process in the presence of a surfactant. Such an agent is believed to assist in wetting out the solid phthalocyanine compound and to assist the water-immiscible solvent in its action in the aqueous medium. The amount of surfactant is not critical and may vary considerably. Generally an amount within the range of 2.0 to 7% by weight based on the crude phthalocyanine is used. Anionic surfactants, such as dioctyl sodium sulfosuccinate ("Aerosol OT"), are preferred. Other surfactants which can be used include:

alkyl aromatic sulfonates ("Nacconol NR")
sodium lauryl sulfate
sulfated castor oil
sodium isopropyl naphthalene sulfate
alkali metal salts of ethylene diamine-tetraacetic acid It is preferred also to conduct this conditioning process in the presence of a small amount of an alkaline salt. Trisodium phosphate is a readily available, economical and effective salt for this purpose. Others which can be used include sodium carbonate, disodium acid phosphate, sodium benzoate, potassium carbonate.

Mixtures of these and equivalent alkailne salts are contemplated also.

The amount of such a salt or salts used is not critical and may vary considerably. A sufficient amonut of such a salt is used to maintain the conditioning mass alkaline to prevent or reduce to a minimum iron solubility. About 2.0 to 10 percent by weight based on the crude phthalocyanine compound is a convenient amount, although more can be used.

The process of our invention is preferably carried out in the presence of a small amount of an oxidizing agent. Generally, about 1 to 6 percent by weight, based on the weight of the crude phthalocyanine compound is conveniently used. It is believed that the oxidizing agent may oxidize impurities present in the crude pigment and prevent reduction of pigment and result in a brighter and/or cleaner shade of pigment. Examples of such oxidizing agents which may be used include sodium chromate, potassium chromate, potassium dichromate, sodium hypochlorite.

The grinding equipment in which the conditioning process is effected can be any of the several types of mills conventionally used in this art to physically reduce the particle size of a pigment substance. Thus, ball mills, pebble mills, vibro mills and the like are suitable. The grinding elements are likewise of the conventional type and include steel balls, pebbles, sections of metal cylinders, and the like.

In accordance with a preferred mode of carrying out the process of our invention, a mixture of 100 parts by weight of crude, unconditioned, phthalocyanine compound, about 15 to 25 parts by weight of a water-immiscible volatile organic liquid, about 2 to 7 parts by weight of an anionic surfactant, e.g. dioctyl sodium sulfosuccinate, "Aerosol® OT," about 2.0 to 6 parts by weight of an inorganic alkaline salt, e.g. trisodium phosphate, about 1 to 6 parts by weight of an inorganic oxidizing agent, e.g., sodium chromate, and about 325 to 385 parts by weight of water, is placed in a suitable grinding mill, ball mill, pebble mill or vibro mill, filled about half of its capacity with grinding elements, steel balls, pebbles, sand or sections of metal rods or cylinders. The mill is rotated at about 65% of the critical speed for about 2 to 4 days at ambient temperature.

The aqueous slurry is separated from the grinding elements, acidified, boiled for ½ to 2 hours, filtered, washed acid-free and dried.

The conditioned phthalocyanine pigments are of especial interest for the coloration of thermosetting acrylic resins which are currently employed in substantial amounts in the preparation of automotive finishes. These resins comprise polymeric derivatives of acrylic and methacrylic acids, their esters, amides, containing one or more functional groups capable of further reaction resulting in a polymer derived from acrylic monomers. This term "thermosetting acrylic resin" as used herein, includes polymers derived from mixtures of acrylic monomers and other monomers such as styrene, acrylonitrile, vinyl toluene, maleic esters and the like. This term is used in the broad rather than in a narrow sense. The preparation of thermosetting acrylic resins is well known and has been described in numerous patents and articles, such as, "Thermosetting Acrylics" by T. J. Miranda in the Journal of Paint Technology, vol. 38, N. 499, August 1966, pp. 469–77, "Thermosetting Acrylic Resins" by K. E. Piggott in the Journal of Oil and Colour Chemists Association, December 1963, pp. 1009–26, the disclosures of which are incorporated herein by reference. Hydroxyl-type acrylic resins, i.e. resins which employ a hydroxyl group as a functional moiety in the cross-linking step of their preparation, are frequently used in the formulation of automotive and appliance enamels since they can be cured at low temperatures with melamine resins. The particular coatings obtained using these resins are characterized by high spray solids, good hardness, flexibility and excellent appearance after spraying and baking.

The present invention will be illustrated by the following specific examples, but it is to be understood that the invention is not to be limited to the details thereof. Parts and percentages are by weight and temperatures are in degrees centigrade, unless otherwise specified.

Example 1

A mixture of 384 parts of crude hexadecachloro copper phthalocyanine (average particle size of greater than one micron), 1280 parts of water, 96.0 parts of a commercial volatile petroleum fraction of 118 to 125° boiling range (Apco Thinner), 19.2 parts of dioctyl sodium sulfosuccinate (dissolved in the Apco Thinner), 16.0 parts of sodium chromate and 16.0 parts of trisodium phosphate was introduced into a ball mill about one-half filled with 1/8" steel balls and the mixture ground therein for about three days at ambient temperature, the mill revolving at 65% of the critical speed. (U.S. Pat. 2,402,167, col. 3, lines 53ff).

Thereafter, the contents of the mill were separated from the grinding elements by screening and the aqueous mass diluted with about 2000 parts of water. After addition of sufficient muriatic acid to render the mass acid to Congo red indicator, the mass was boiled for one hour, filtered, the filter cake washed acid-free with water, and the washed cake was dried. The resultant conditioned hexadecachloro copper phthalocyanine pigment had a very soft texture and was readily dispersible in organic resin coating compositions.

If, instead of acidifying the conditioned phthalocyanine slurry with muriatic acid, it was rendered alkaline with caustic soda and then boiled, etc., a conditioned phthalocyanine pigment of comparable quality was obtained.

Example 2

The procedure of Example 1 above was repeated using in place of 1/8" steel balls, flint pebbles (average size 3/4" in longest diameter). The conditioned pigment was obtained in analogous form.

Example 3

The procedure of Example 1 was repeated using in place of hexadecachlorocopperphthalocyanine, a like quantity of unconditioned monochloro-monobromo copper phthalocyanine.

The conditioned pigment obtained in this manner possessed a soft texture and was eminently suitable for the pigmentation of the thermosetting acrylic coating compositions.

Example 4

The procedure of Example 1 above was repeated using in place of hexadecachlorocopperphthalocyanine, a like quantity of crude copper phthalocyanine. The resultant pigment was obtained in a comparable conditioned state, i.e., the product was of a very soft texture and was readily dispersible in resin coating compositions.

Example 5

The conditioned pigments were incorporated into resin coating compositions in the following manner.

A mixture of 39 parts of a commercially available thermosetting acrylic resin solution containing about 50% non-volatiles, comprising styrene-modified copolymers of methacrylic and acrylate esters and containing free hydroxyl and carboxyl groups, 66 parts of xylene and 20 parts of hexadecachlorocopperphthalocyanine, conditioned as described in Example 1 above, was placed in a Mason jar containing about 900 parts of 1/4" steel balls and the mixture was ground therein for about 30–40 hours.

An additional 50 parts of the acrylic resin solution and 135 parts of xylene were added and the mixture was ground for two hours more. Next, 85 parts of the acrylic resin solution and 26.5 parts of xylene were added to the mixture which then was ground for one hour. Thereafter, 30 parts of the acrylic resin solution and 70 parts of butylated melamine #47 resin solution containing 60% solids were added and the mixture was shaken vigorously for 1/2 hour.

The resulting pigmented coating composition was separated from the steel balls by screening and then used to coat primed steel panels, in a conventional manner.

The panels were baked and then exposed to Florida sunshine for 12 months without perceptible loss of color.

This prolonged exposure without perceptible change in shade is evidence of the excellent light-fastness of the phthalocyanine pigment conditioned in accordance with our invention.

We claim:

1. A process for conditioning phthalocyanine compounds to pigment form which consists essentially of grinding a crude unconditioned phthalocyanine compound suspended in a liquid grinding medium comprising water and a liquid water-immiscible volatile organic solvent, said water being present in an amount which is at least about 60% by weight of said medium, and said organic solvent being present in the amount of from about 15 to 30 parts by weight for each 100 parts by weight of the crude phthalocyanine compound.

2. The process of claim 1 in which the crude phthalocyanine compound is suspended in at least 300 parts by weight of the aqueous suspension medium per 100 parts by weight of the crude phthalocyanine compound.

3. The process of claim 2 in which the crude phthalocyanine compound is suspended in from about 350 to about 600 parts by weight of the aqueous suspension medium per 100 parts of the crude phthalocyanine compound.

4. The process of claim 3 in which the crude phthalocyanine compound is a halogenated copper phthalocyanine.

5. The process of claim 4 in which the halogenated copper phthalocyanine is a chlorinated copper phthalocyanine.

6. The process of claim 5 in which the chlorinated copper phthalocyanine is hexadecachlorocopperphthalocyanine.

7. The process of claim 1 in which the crude phthalocyanine compound is ground in the presence also of an anionic surfactant, an inorganic oxidizing agent and an inorganic alkaline salt.

8. The process of claim 4 in which the water-immiscible organic solvent is a mixture of aliphatic hydrocarbons derived from petroleum.

9. The process of claim 8 in which the mixture of aliphatic hydrocarbons boils over a range of about 60° to about 85° C.

10. The process of claim 1 in which the suspension medium contains from about 75% to 95% by weight of water.

11. The process of claim 10 in which the crude phthalocyanine compound is ground in the presence also of an anionic surfactant, an inorganic oxidizing agent and an inorganic alkaline salt.

References Cited

UNITED STATES PATENTS

| | | | |
|---|---|---|---|
| 2,065,762 | 12/1936 | Stanley | 260—314.5 |
| 2,900,390 | 8/1959 | Brouillard et al. | 106—288 Q |
| 3,017,414 | 1/1962 | Minnich et al. | 260—314.5 |
| 3,127,412 | 3/1964 | Gaertner et al. | 260—314.5 |
| 2,556,727 | 6/1951 | Lane et al. | 106—288 Q |

JAMES E. POER, Primary Examiner

U.S. Cl. X.R.

106—309